United States Patent Office.

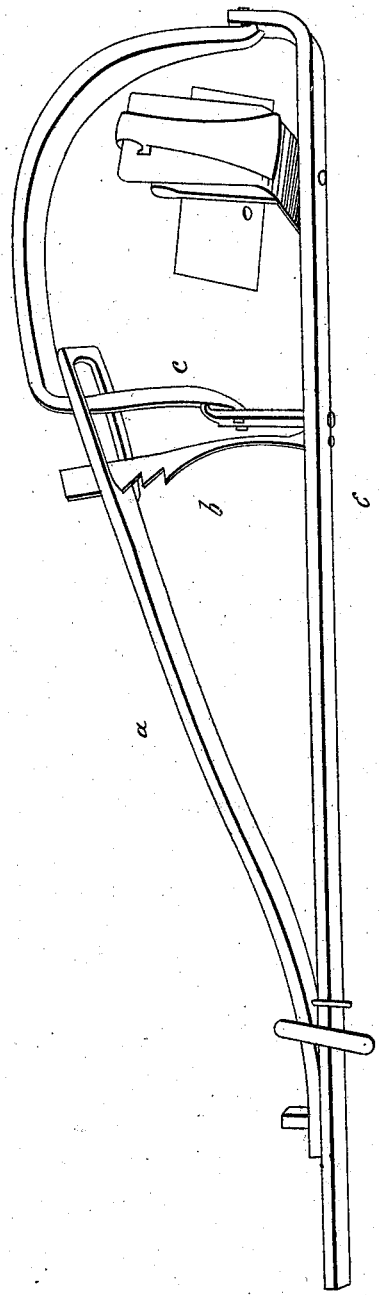

WILLIAM N. REED, OF WASHINGTON, DISTRICT OF COLUMBIA.

Letters Patent No. 94,975, dated September 21, 1869.

IMPROVED ANIMAL-TRAP.

The Schedule referred to in these Letters Patent and making part of the same.

*To all whom it may concern:*

Be it known that I, WILLIAM N. REED, of Washington city, District of Columbia, have invented a new and improved mode of constructing that kind of animal-trap usually termed "A Steel-Trap," so as to prevent the escape of animals when caught; and I do hereby declare that the following is a full and exact description thereof, reference being had to the accompanying drawings, and to the letters of reference marked thereon.

The nature of my invention consists in the use of an upright spring-post or lock, to support the main spring when the trap is sprung, as an additional security against the escape of an animal when caught.

To enable others skilled in the art to make and use my invention, I will proceed to describe its construction and operation.

I construct my trap in any of the known forms of "steel-traps," with the foregoing exceptions, and apply thereto an upright angular toothed spring-post or lock, firmly attached to the bed-piece of the trap, marked $e$, with its upper end loosely inserted in an opening in the main spring, its lower half being formed into a spring that presses the post against one side of said opening. The said teeth being flat at top (see drawing) and very slanting on the under side, allow the main spring free motion upward, but prevent its return, thus binding the jaws of the trap together and rendering the escape of an animal impossible.

At $a$, fig. 1, in the accompanying drawing, is seen the main spring, (the trap being represented as just sprung) supported by the spring-post $b$, the upper tooth of which securely locks the main spring in position, thus binding together the jaws of the trap, so as to effectually resist all efforts of the animal to escape, even should he happen to step on the main spring, a contingency that would, in a common steel-trap, be very likely to result in his liberation.

At $c$, that portion of the jaws are seen, bent as described, in the form of the arc of a circle, whose centre is at the opposite end of the main spring. This device not only affords more room inside the trap when set, but enables the spring to traverse a greater distance on the jaws, rising higher above the centre on which they turn, thus giving the spring a better purchase.

Should the animal be caught in any manner that separated the jaws of the trap more than usual, the main spring would, in such contingency, be supported by the middle or lower tooth, substantially as heretofore described.

What I claim as my invention, and desire to secure by Letters Patent, is—

The toothed spring-post lock, in combination with the main spring, to prevent the premature opening of the trap, as herein described.

WM. N. REED.

Witnesses:
R. H. MARSH,
P. N. REED.